March 28, 1961 J. P. LOPEZ ET AL 2,976,780
FOLDING BOX SQUARING MACHINE
Filed Nov. 7, 1956 10 Sheets-Sheet 1
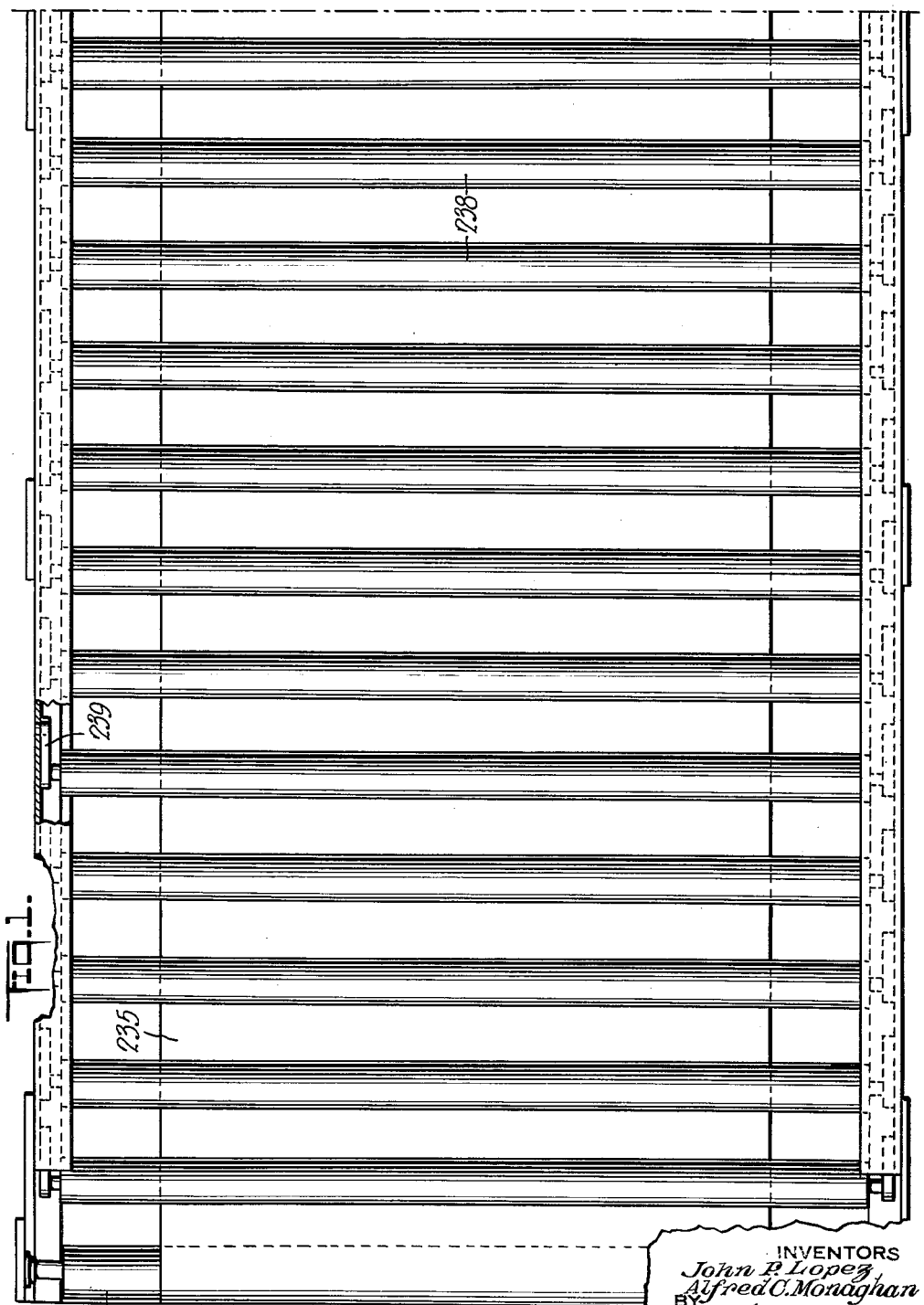
INVENTORS
John P. Lopez
Alfred C. Monaghan
BY
Dean Fairbank & Hirsch
ATTORNEYS

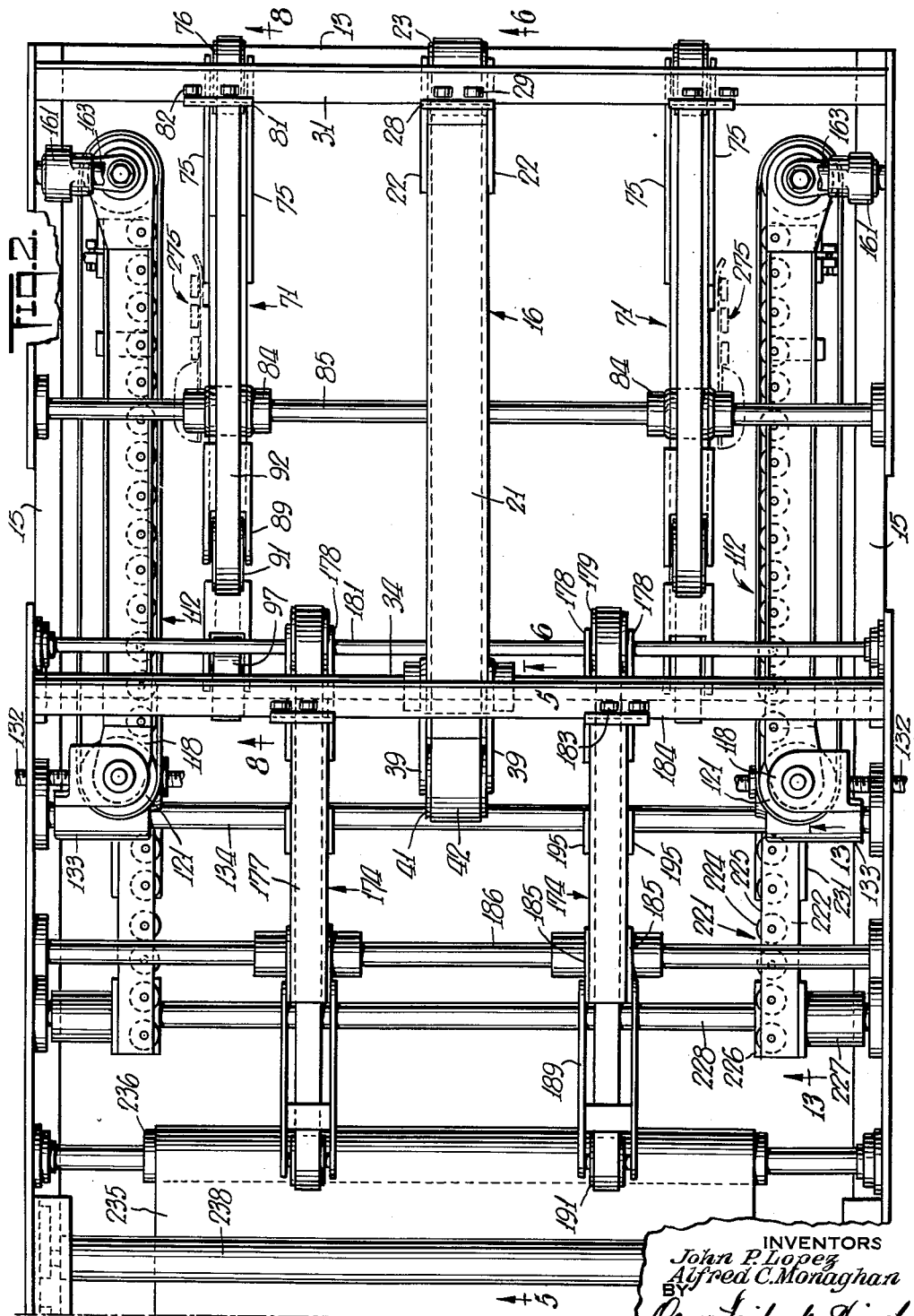

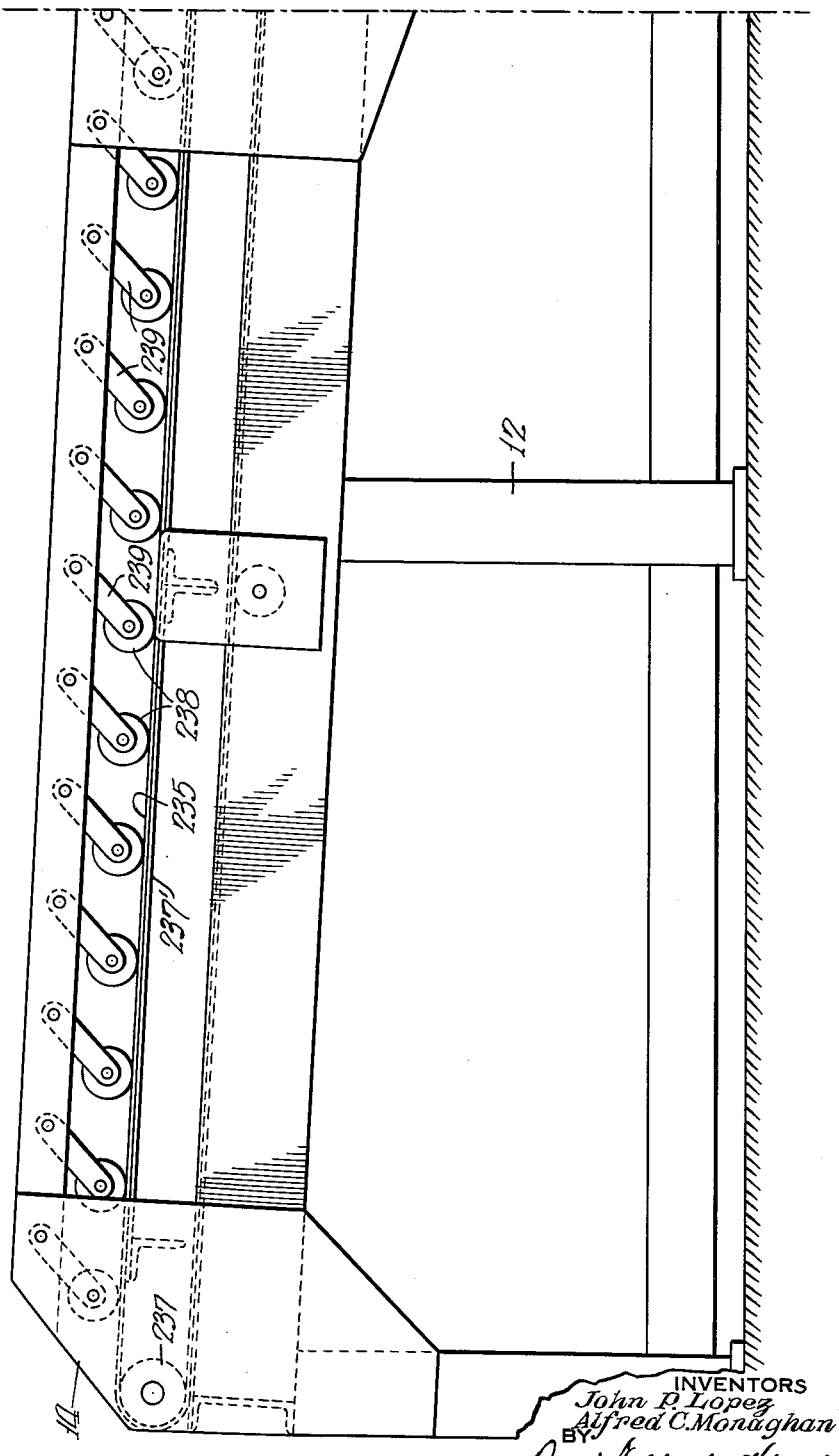

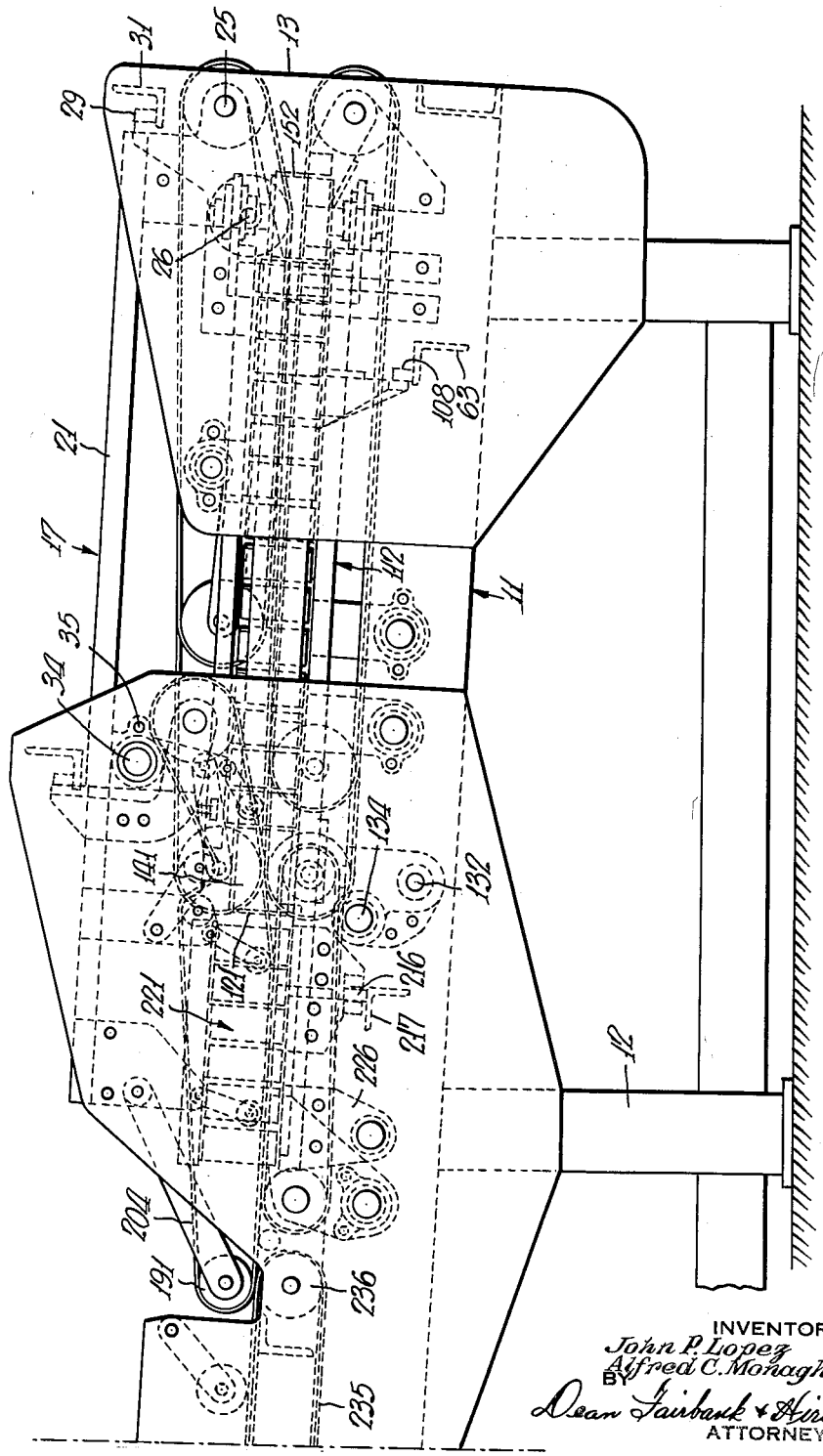

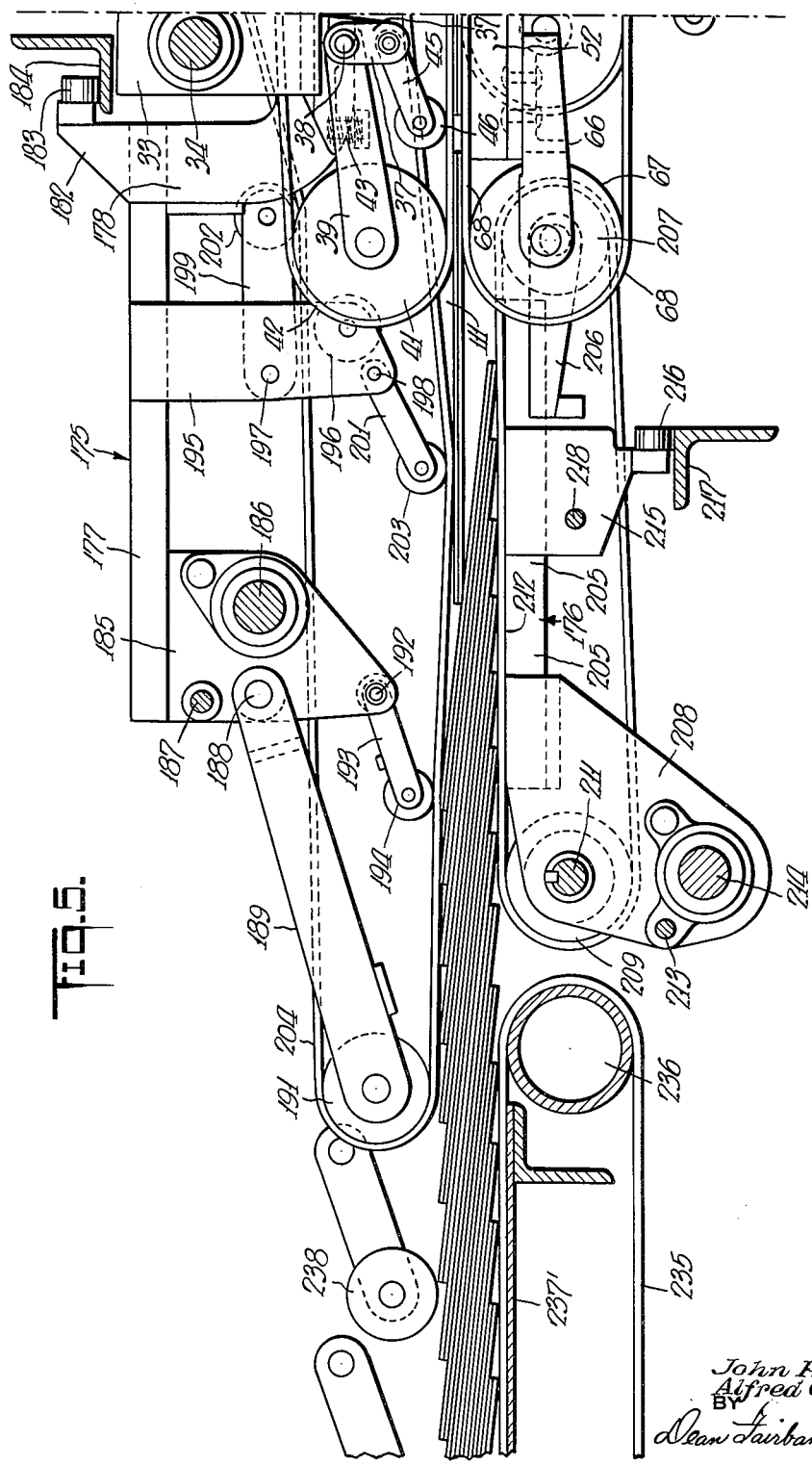

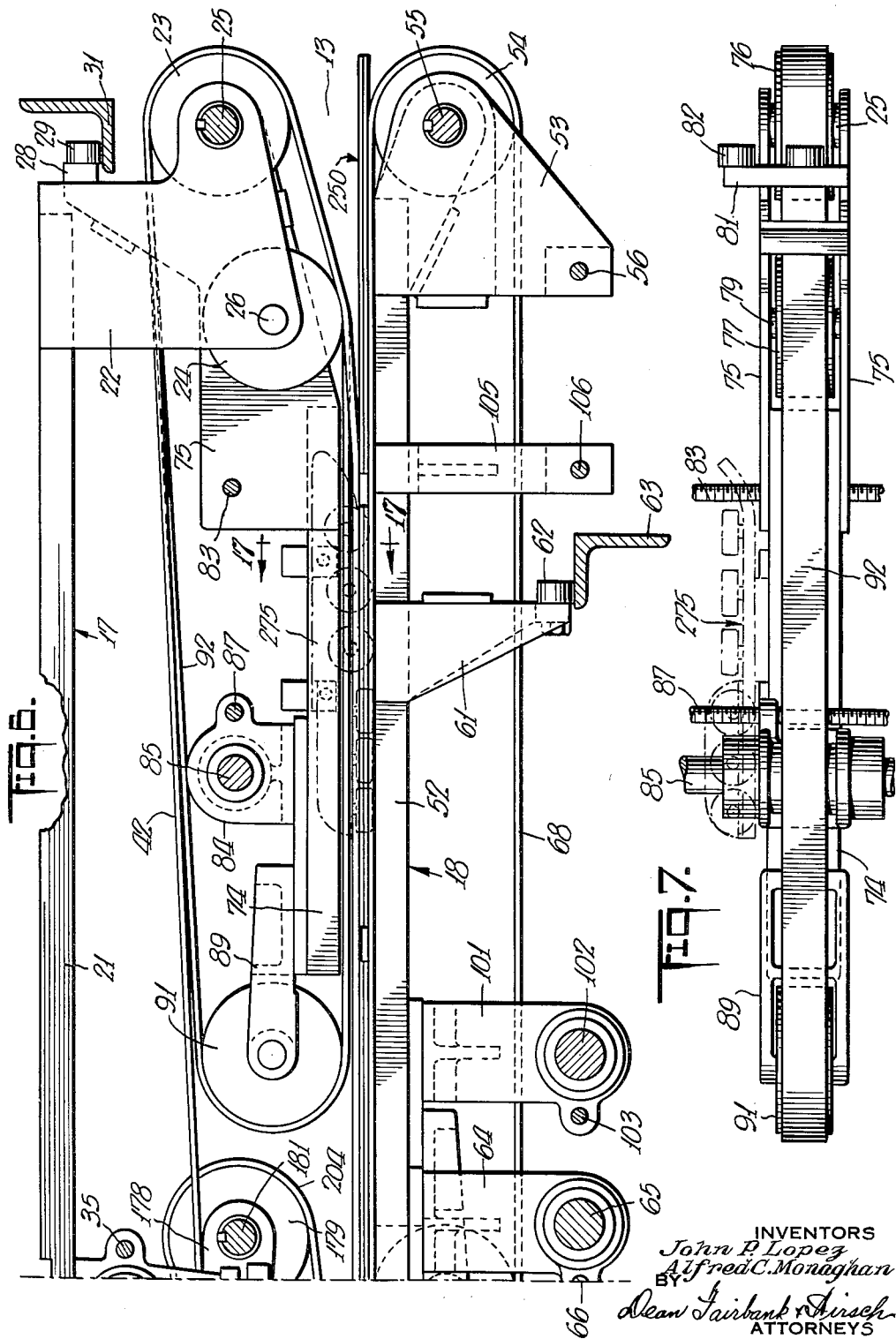

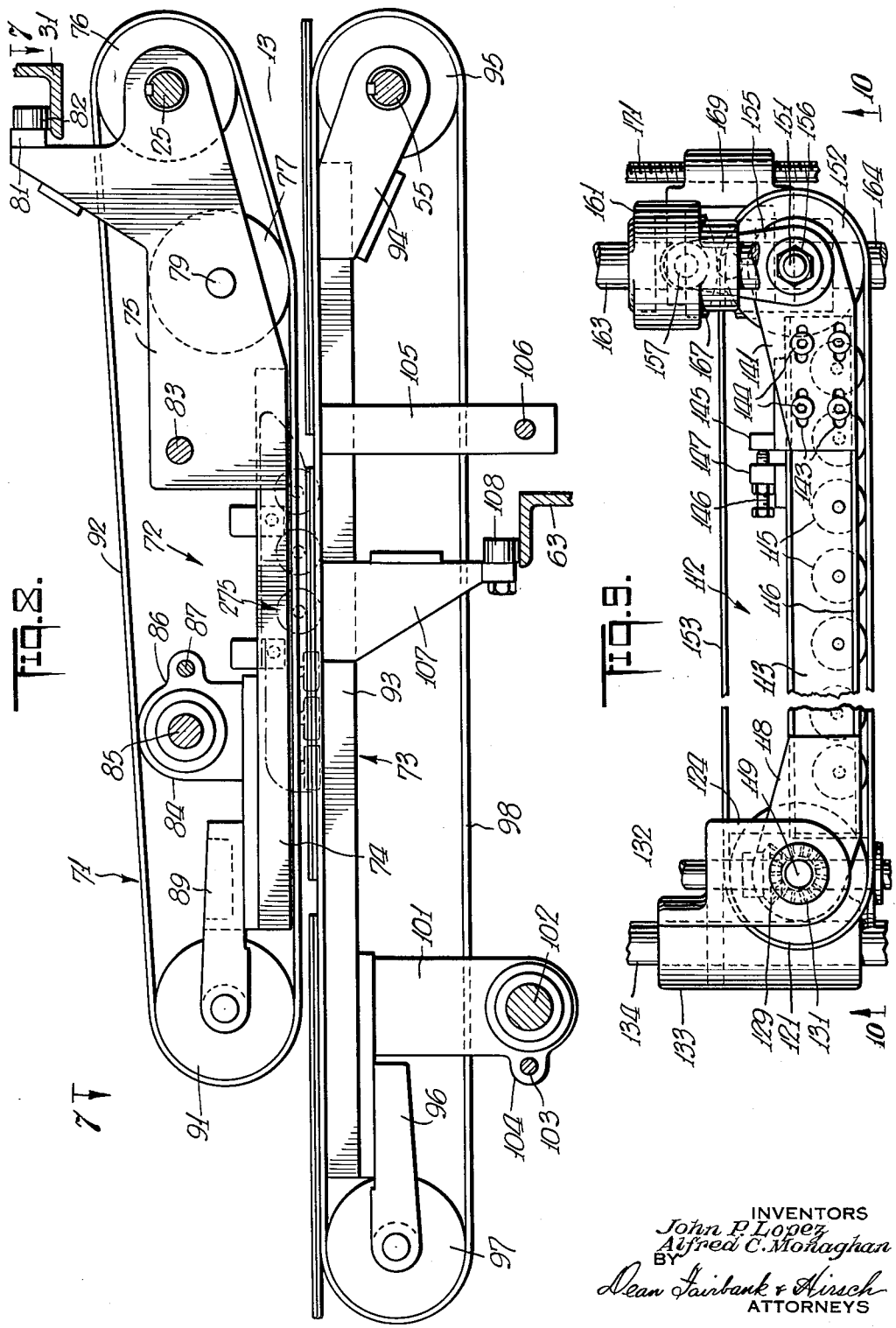

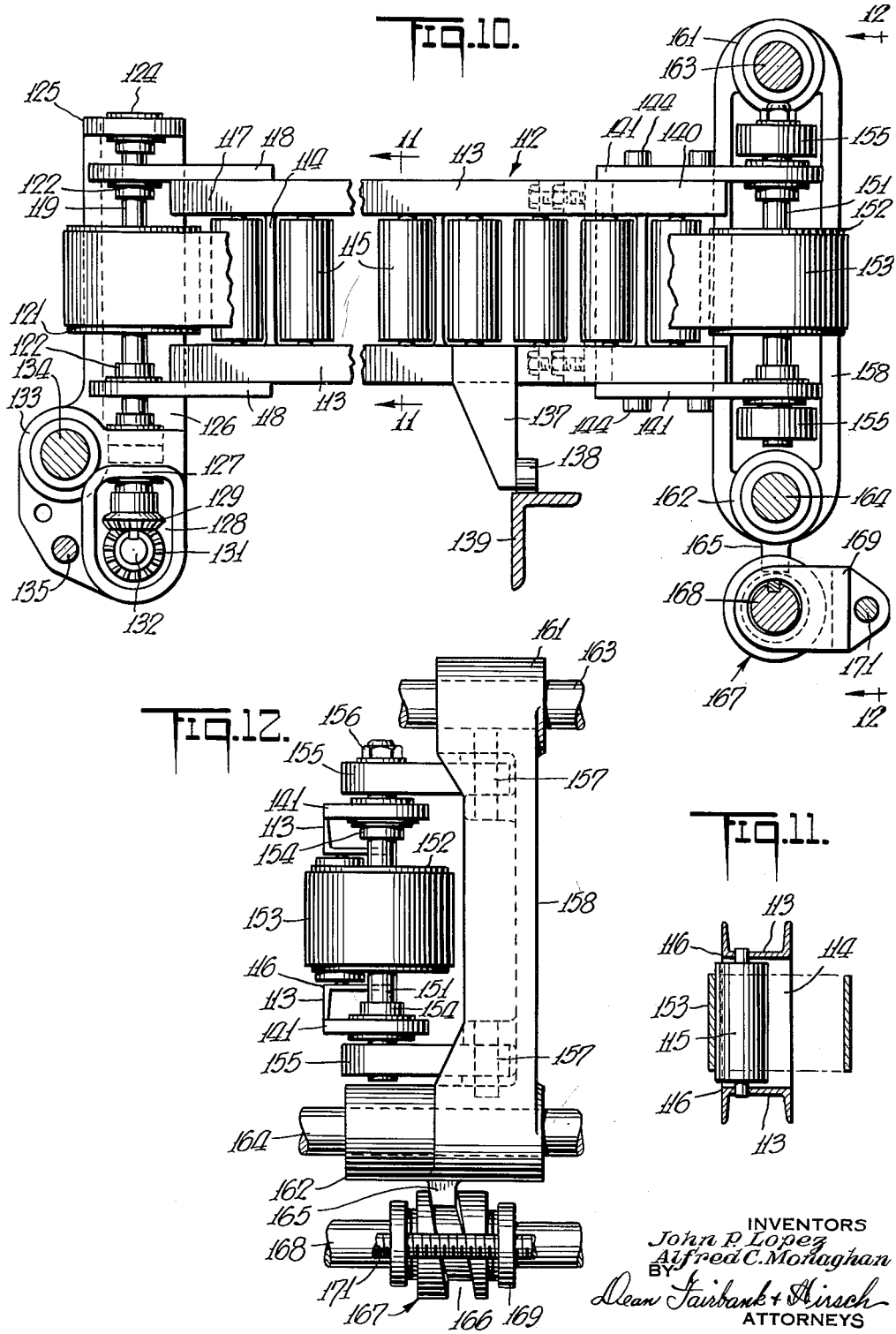

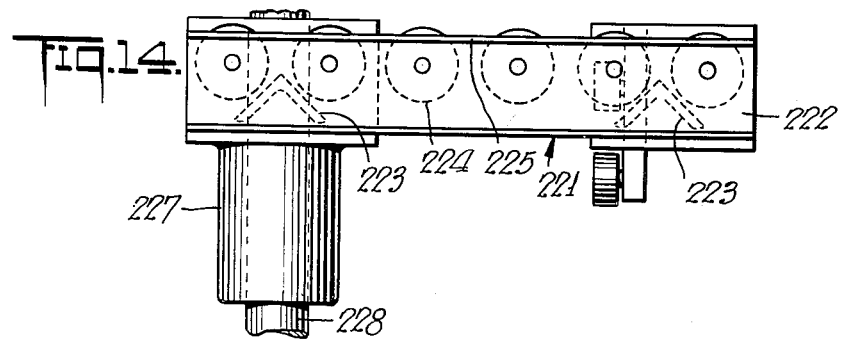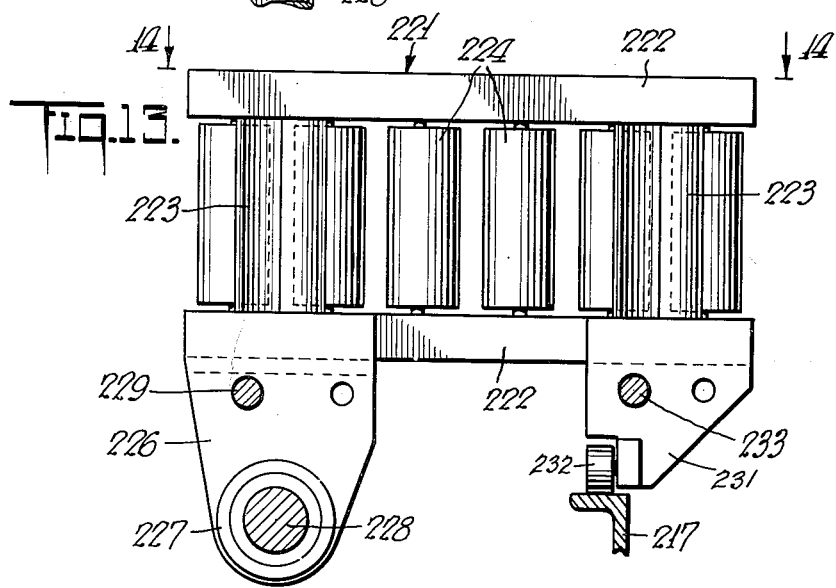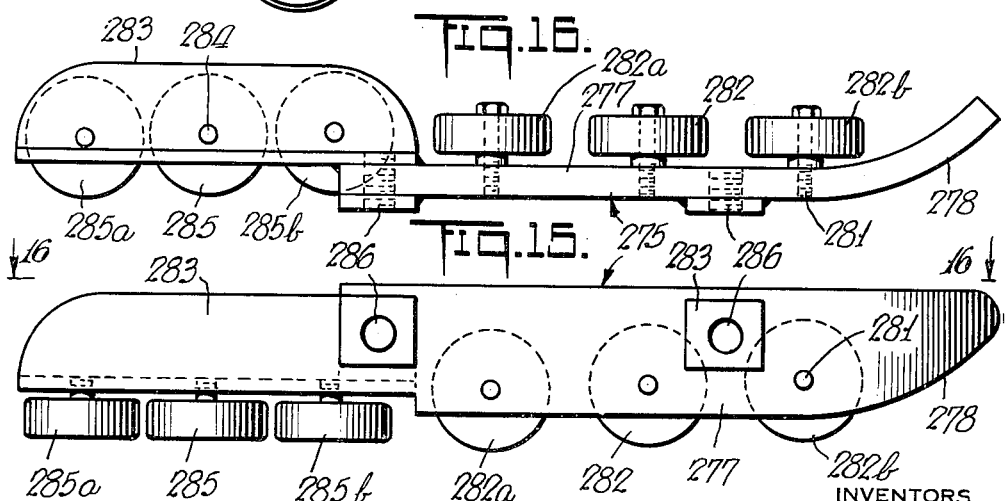

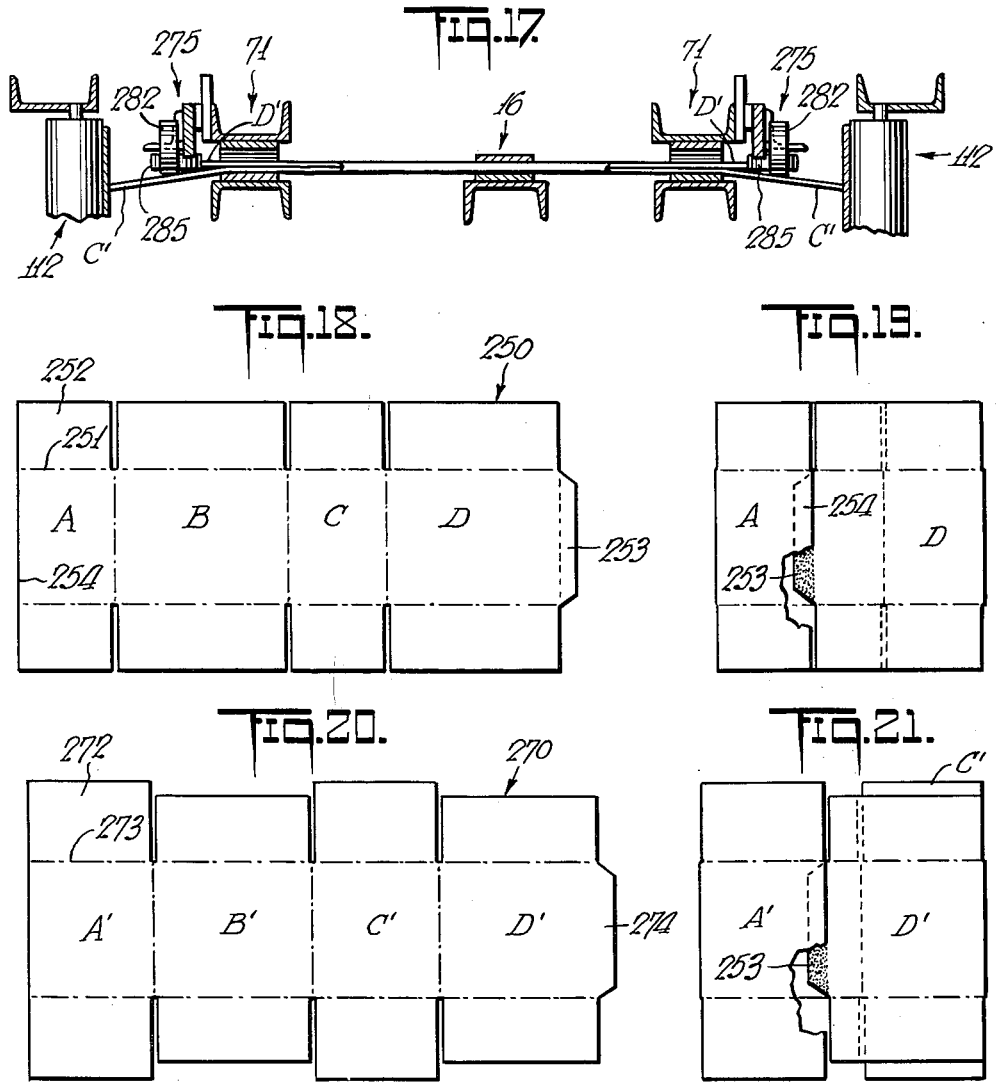

United States Patent Office 2,976,780
Patented Mar. 28, 1961

2,976,780
FOLDING BOX SQUARING MACHINE

John P. Lopez, Westfield, and Alfred C. Monaghan, Union, N.J., assignors to Universal Corrugated Box Machinery Corporation, Linden, N.J., a corporation of New York Filed Nov. 7, 1956, Ser. No. 620,841

18 Claims. (Cl. 93—36)

This invention relates to the art of folding box machinery and more particularly to a machine for squaring corrugated folded box blanks having a glued connecting flap.

As conducive to an understanding of the invention it is noted that in the formation of the box blank, the scoring rolls that define the fold lines in the blank may register between corrugations in the box blank; on top of a corrugation or in an intermediate position. Hence, when the panels of the blank are folded, such folded blank may not be completely square. As a result, after the connecting flap is glued and the folded box blank is opened, the corners of the box may buckle with resultant weakening thereof and in addition to making an imperfect box, the box may not be truly a rectangular parallelepiped so that stacking of filled boxes is difficult.

Where the folded box blanks, each with the connecting flap glued and adhering to the adjacent panel, but with the glue not set, are successively discharged against a backstop onto a conveyor which shingles such box blanks and thereupon, after each blank is discharged onto the conveyer, force is exerted against the shingled box blanks to move them transversely against the backstop to square the blanks, and the box blanks are released prior to each application of force, if the glue on the connecting flaps of the uppermost box blanks of the shingled pile has not completely set, the flaps may move so that the box blanks are no longer square and in addition the effectiveness of the glued joint may be impaired. Furthermore, where the glue has set on the connecting flaps of the lowermost box blanks of the shingled pile, if such blanks are not square, application of such force will crush the edges of such lowermost box blanks.

In addition, when the edges of the shingled box blanks rub against a fixed member as the boxes are advanced, the resultant friction may cause deformation of the edges of the box.

Where the box blank to be squared is of the flap cut type having adjacent flaps of different widths and the squaring action is effected by exerting pressure against opposed edges of the box blank, where the pressure exerting members react only against the wider flaps, the box blank may not be squared with the difficulties above pointed out.

According to the invention, folded box blanks are successively fed longitudinally into the machine onto a conveyer which advances the box blanks through a channel having at least one movable wall that exerts force against the edges of the box blank to effect the squaring action. The movable wall acts upon only one box blank at a time and after the blank has been squared it is discharged onto a conveyer moving at a slower speed than the first conveyer to effect a shingling action. The box blank is retained in squared position while it is discharged onto the second conveyer and pressure is thereupon maintained against the connecting flap so that the glue thereon will set properly with the folded box blank retained in squared condition.

More specifically, a pair of movable walls are provided, one on each side of the box blank and each wall comprises a belt advancing in the same direction as the box blank and adapted to abut against the edges thereof.

In another embodiment of the invention, where flap cut boxes are being processed, means are provided to exert transverse pressure against the edges of all of the side flaps of the box blank to effect the squaring action.

In the accompanying drawings in which are shown one or more of various possible embodiments of the several features of the invention, Figs. 1 and 2 are top plan views of the machine, Figs. 3 and 4 are side elevational views of the machine, Fig. 5 is a longitudinal sectional view taken along line 5—5 of Fig. 2, Fig. 6 is a view similar to Fig. 5 taken along line 6—6 of Fig. 2, Fig. 7 is a detail top plan view taken along line 7—7 of Fig. 6 showing one of the side conveyers, Fig. 8 is a longitudinal sectional view taken along line 8—8 of Fig. 2, Fig. 9 is a top plan view of a squaring assembly, Fig. 10 is a side elevational view of a squaring assembly taken along line 10—10 of Fig. 9, Fig. 11 is a sectional view taken along line 11—11 of Fig. 10, Fig. 12 is an end view taken along line 12—12 of Fig. 10, Fig. 13 is a longitudinal sectional view taken along line 13—13 of Fig. 2 of the idler roller assembly, Fig. 14 is a top plan view taken along line 14—14 of Fig. 13, Fig. 15 is a side elevational view of the flap cut box squaring attachment, Fig. 16 is a top plan view taken along line 16—16 of Fig. 15, Fig. 17 is a fragmentary sectional view of the flap cut box squaring attachment taken along line 17—17 of Fig. 6, Fig. 18 is a plan view of a straight cut box blank, Fig. 19 is a view similar to Fig. 18 of the box blank in folded condition.

Fig. 20 is a plan view of a flap cut box blank, and

Fig. 21 is a view similar to Fig. 18 of the box blank in folded condition.

Referring now to the drawings, as shown in Figs. 3 and 4, the machine comprises a substantially rectangular frame 11 supported by standards 12 mounted on the floor, the standards being of progressively increasing height from the inlet 13 of the machine to its discharge or outlet end 14.

Extending between the side beams 15 of the frame 11 (Fig. 2) is the center belt conveyer 16. This conveyer comprises an upper and a lower assembly 17 and 18 respectively (Figs. 5 and 6). The upper assembly 17 comprises a beam 21 having a pair of depending plates 22 adjacent the inlet end 13 of the machine, between which are mounted pulleys 23 and 24. The pulley 23 is keyed to drive shaft 25 so that it is slidably mounted thereon and the pulley 24 is an idler pulley with its axis 26 below that of pulley 23.

Extending transversely across plates 22 is a bar 28 from which extend rollers 29 which ride on a track 31 extending transversely between side beams 15 at the inlet 13. The end of beam 21 remote from inlet 13 has a pair of arms 33 depending therefrom through which a supporting rod 34 extends. The arms 33 also have transversely aligned threaded openings through which a correspondingly threaded adjustment screw 35 extends so that upon rotation of screw 35 the center belt assembly 17 may be moved transversely in either direction, riding on rod 34 and track 31.

As shown in Fig. 5, the arms 33 have depending ears 37 which pivotally mount as at 38 at their upper end the ends of the legs 39 of a support for a pulley 41, a belt 42 encompassing said pulley 41 as well as driven pulley 23 and idler pulley 24. As shown in Fig. 5, the free end of pulley support 39 is normally urged downwardly as by coil spring 43.

The depending ears 37 also pivotally mount a support 45 for a weighted roller 46, the latter reacting against the lower run of belt 42.

The lower assembly 18 of the center belt conveyer 16 comprises a beam 52 extending longitudinally of the frame beneath the top assembly 17. The beam 52 adjacent the inlet 13 has a pair of plates 53 depending therefrom between which a pulley 54 is positioned, said pulley being keyed to drive shaft 55. The plates 53 also have threaded openings through which extend a correspondingly threaded screw 56 to permit transverse adjustment of the lower assembly 18.

Depending from beam 52 is a bracket 61, which mounts rollers 62 that ride on a track 63 extending transversely between side beams 15 of the frame. Also depending from beam 52 is a bracket 64 through which a supporting rod 65 extends, the bracket 64 also having a threaded opening through which extends a screw 66 ganged with adjustment screw 56 so that upon rotation of said screws, transverse displacement of the lower assembly will be effected without binding thereof on supporting rod 65 and shaft 55.

The beam 52 also mounts a pulley support 66 having a pair of arms between which a pulley 67 is rotatably mounted, an endless belt 68 encompassing the pulleys 67 and 54.

Positioned on each side of the center belt conveyer 16 are the side belt conveyers 71 which are identical, each comprising an upper and lower assembly 72, 73 respectively.

As shown in Fig. 8, the upper assembly 72 comprises a beam 74 extending parallel to side beams 15 of the frame, the end of beam 74 adjacent the inlet 13 mounting a pair of upstanding plates 75 which carry pulleys 76 and 77, the pulley 76 being keyed to drive shaft 25 and the pulley 77 being an idler, the axis 79 of said pulley 77 being below that of pulley 76.

The plates 75 have a bar 81 extending transversely thereacross which mounts rollers 82 that ride on track 31 to support the associated end of the upper assembly 72. In addition, the plates 75 have threaded openings through which extend an adjustment screw 83 to effect transverse movement of the assembly. The beam 74 carries an upstanding block 84 through which a supporting rod 85 extends and the block has an ear 86 through which extends a screw 87 also to effect transverse movement of the upper assembly 72 in conjunction with screw 83.

Mounted on the other end of beam 75 is a support 89 for a pulley 91, an endless belt 92 encompassing pulleys 91, 77 and 76.

The lower assembly 73 of the side belt conveyer 71 comprises a beam 93 having a pair of arms 94 affixed to the end thereof adjacent inlet 13 between which is positioned a pulley 95 keyed on drive shaft 55. The other end of beam 93 also has a pair of arms 96 affixed thereto which rotatably mount a pulley 97, an endless belt 98 encompassing said pulleys.

Depending from beam 93 is a bracket 101 through the lower end of which extends supporting rod 102, a screw 103 also extending through a threaded opening in an ear 104 formed integral with the bracket 101 to effect transverse movement of the assembly. In addition, a bar 105 also depends from beam 93 and has a threaded opening through which adjustment screw 106 extends, the screws 103 and 106 operating conjointly for even transverse movement of the assembly without binding.

For further support for the assembly 73 the beam 93 has a depending bracket 107 which mounts rollers 108 at its lower end which ride on track 63.

With the construction thus far described, the flattened box blanks moved into the inlet 13 of the machine will be advanced by the lower belt 68 of the center belt conveyer 16 and the lower belts 98 of the side belt conveyers 71, the upper side belts 92 being spaced from the associated lower belts 98 through their entire length and the upper center belt 42 being spaced from the associated lower belt 68 from the inlet end 13 to the discharge end 111 (Fig. 5), the belts 42 and 68 engaging at their discharge end by reason of the tension exerted by spring 43 against pulley support 39.

Means are provided to square the box blanks as they are advanced by the lower belts 68 and 98.

To this end, as shown in Figs. 2, 9, 10, 11 and 12, a pair of identical squaring assemblies 112 are provided straddling the center and side belt conveyers 16 and 71 and defining a channel through which the box blanks are advanced.

As shown in Figs. 10 to 12, each squaring assembly 112 comprises a pair of parallel channel beams 113 joined by ribs 114. Rotatably mounted between the beams 113 are a plurality of rollers 115, the peripheries of which extend beyond the inner edges 116 of the beams 113.

Affixed to the rear ends 117 of beams 113 are parallel horizontal arms 118 which have vertically aligned openings through which extend a shaft 119, a pulley 121 being affixed to said shaft. Also affixed to shaft 119 adjacent the arms 118 and between the latter, are thrust bearings 122 which prevent vertical movement of the shaft through the openings in arms 118, yet permit free rotation thereof in said openings.

The upper end of the shaft 119 is positioned in a bearing 124 mounted in an arm 125 extending laterally from a vertical plate 126. The lower end of the shaft 119 extends through the top wall 127 of a gear housing 128 extending laterally outward from said plate, and mounts a bevel gear 129 which meshes with a complementary bevel gear 131 keyed on a drive shaft 132. The lower end of plate 126 adjacent housing 128 has a lateral hub 133 through which extends a supporting rod 134 and the plate 126 also has a threaded opening through which extends an adjustment screw 135.

The lower beam 113 of the assembly 112 between its ends has a depending bracket 137 which mounts rollers 138 that ride on track 139 to serve as a sliding support for the assembly.

Affixed to the front ends 140 of beams 113 are horizontal arms 141 which are mounted so that they may be moved longitudinally with respect to said beams. To this end, each of the arms has a plurality of elongated slots 143 (Fig. 9) through which extend screws 144 and the arms have laterally extending abutment members 145 against which may abut the free end of screws 146 extending through lateral projections 147 on beams 113.

The free ends of arms 141 also have vertically aligned openings through which extends a shaft 151, a pulley 152 being affixed to said shaft between said arms, the pulleys 152 and 121 carrying an endless belt 153, the inner run of which rides on the peripheries of rollers 115 as shown in Fig. 9.

Also affixed to said shaft 151 adjacent the arms 141 and between the latter are thrust bearings 154 which prevent vertical movement of the shaft 151, yet permit free rotation thereof. The upper and lower ends of the shaft 151 extends through bearings in one end of oscillating arms 155, the upper end of the shaft being secured by nut 156 and the other ends of arms 155 are pivotally mounted as by pins 157 to a vertical plate 158.

As shown in Figs. 10 and 12, the plate 158 has laterally extending hubs 161 and 162 at each end through which extend supporting rods 163 and 164 respectively. The lower end of plate 158 has a depending stud 165 which extends into a track 166 in a cam 167 keyed on a cam drive shaft 168. The shaft 168 also extends through the arms of a yoke 169 which straddle the cam, said yoke having a threaded opening through which an adjustment screw 171 extends, the screws 171 and 135 operating conjointly for transverse movement of the assembly 112.

Means are provided to shingle the box blanks after they have been squared.

To this end, as shown in Figs. 2, 5 and 6, a pair of identical spaced parallel shingling conveyers 174 are provided, each comprising an upper and lower assembly 175, 176 respectively. The upper assembly 175 comprises a beam 177 having a pair of depending arms 178 at one end between which a pulley 179 is positioned, the pulley being keyed to a drive shaft 181. The upper end 182 of arms 178 mounts rollers 183 which ride on a track 184 extending transversely across the frame. The other end of beam 177 has a pair of depending arms 185 through which extend a supporting rod 186 and said arms have threaded openings through which extend adjustment screw 187.

Pivoted as at 188 to the arms 185 is a yoke 189 between the free ends of which a pulley 191 is rotatably mounted, the arms 185 also pivotally mounting as at 192 a yoke 193 which rotatably mounts a weighted roller 194.

Depending from the beam 177 between its ends are arms 195 between which, at the lower ends thereof, a roller 196 is rotatably mounted. The arms also pivotally mount as at 197 and 198, the ends of yokes 199 and 201 which rotatably mount weighted rollers 202 and 203 respectively.

As shown in Figs. 5 and 6, a belt 204 encompasses pulleys 191 and 179 and the rollers 194, 203 and 202 react against the upper and lower runs of said belt to maintain tension thereon.

Associated with each of upper shingling assemblies 175 is the lower shingling assembly 176 which comprises a beam 205 having a pair of arms 206 at one end between which a pulley 207 is rotatably mounted. The beam 205 at its other end has a pair of depending arms 208 between which a pulley 209 is positioned, said pulley being keyed to a drive shaft 211 for rotation of belt 212 encompassing said pulleys 209 and 207. The arms 208 also have aligned openings through which extend an adjustment screw 213 and openings through which extend supporting rod 214.

Affixed to beam 205 between its ends is a bracket 215 which mounts rollers 216 that ride on track 217, said bracket also having an opening to accommodate adjustment screw 218 that operates conjointly with screw 213 to effect transverse adjustment of the assembly.

As is clearly shown in Fig. 5, the belts 212 are at a lower level than the belts 68 and 98 of the center and side conveyers and the belts 212 are driven at a slower speed than the belts 68 and 98 to effect the shingling action.

In order to ensure that the boxes will remain square when they are dropped onto the belts 212, a pair of spaced side idler roller assemblies 221 are provided.

As shown in Figs. 2 and 14, each of the side idler assemblies comprises a pair of vertically spaced beams 222 joined by ribs 223. Rotatably mounted between beams 222 are a plurality of idler rollers 224, the peripheries of which extend beyond the inner edges 225 of the beams.

Mounted on one end of the beams 222 and depending therefrom are arms 226 which carry a hub 227 through which extends a support rod 228, the arms 226 having openings through which extends an adjustment screw 229. The beams also mount at their other end arms 231 which carry rollers 232 that ride on track 217, the arms 231 also having an adjustment screw 233 extending therethrough that operates conjointly with screw 229.

As is shown in Fig. 2, the rollers of the idler assemblies 221 are substantially longitudinally aligned with the belts of the squaring assemblies 112 and are positioned at the discharge end 111 (Fig. 5) of the center belt assembly so that as the box blanks are discharged from the center belt assembly onto the belts 212 (Fig. 5) they will be guided by the idler assemblies.

Extending longitudinally of the belts 212 is a conveyer belt 235 extending substantially the width of the machine and encompassing pulleys 236 and 237, said belt 235 being driven at the same rate of speed as the belts 212. The pulley 236 is adjacent the pulley 209 as shown in Fig. 5 and the upper run of conveyor belt 236 rides on a table 237'.

In order to retain the box blanks in shingled relation as they are advanced by the conveyer belts, and retain the glued flaps in juxtaposition to permit the glue to set, a plurality of rollers 238 are provided rotatably mounted on arms 239 pivoted at one end to the side beams 15 of the frame.

*Operation*

The straight cut box blank 250 illustratively shown in Fig. 18 is of conventional type and comprises four rectangular panels A, B, C and D; panels A, C and B, D respectively being of the same dimensions. The side edges 251 of the panels are suitably scored for ready folding thereof and each of said edges 251 has a rectangular flap 252 extending laterally therefrom. In addition, the end of panel D has a connector flap 253 formed integral therewith to which glue may be applied so that when the blank is folded to the position shown in Fig. 19, the connector flap 253 will be positioned beneath the end edge 254 of panel A and secured thereto.

In the operation of the equipment with straight cut box blanks of the type shown in Fig. 18, the equipment is set up by rotation of screws 103, 106 and 83, 87 (Fig. 8) to space the side belt conveyers 71 so that the outer edges of the flaps 252 of the box blank 250 will extend laterally beyond the spaced pairs of belts 92, 98. The center belt conveyer 16 is adjusted by screws 35, 56, 103 (Fig. 6) so that it will be aligned with the connector flap 253 of the box blank and the squaring assemblies 112 are adjusted by screws 135, 171 (Fig. 10) so that they will be spaced by a distance equal to the width of the box blanks. The idler roller assemblies 221 are adjusted by screws 229, 233 (Fig. 13) so that the rollers thereof are longitudinally aligned with the belts 153 of the squaring assemblies 112 and the shingling conveyers 174 are adjusted by screws 187, 213, 218 (Fig. 5) so that they are equidistantly spaced from the center belt conveyer 16.

The box blank 250 has glue applied to the top surface of connector flap 253 against which the corresponding portion of the panel A of the blank is pressed. The folded blanks 250 with the glue still not set, are successively inserted into the inlet 13 of the machine as shown in Fig. 6.

As the equipment for forming and folding the box blank and applying the glue to the connector flap 253 may be of any conventional type and forms no part of this invention, it has not been described.

The box blanks 250 will be advanced through the channel defined by the spaced squaring assemblies 112 by the lower belts of the center and side conveyers 16 and 71. By reason of the upper belts of said conveyers 16 and 71, the center and side edges of the box blank will be restrained from upward movement.

By reason of the drive imparted from shaft 132 (Fig. 10) through bevel gears 131 and 129, the shaft 119 and pulley 121 thereon will be rotated as will the belt 153 so that its inner run will move in direction toward the discharge end 111 of the center conveyer 16. As the belts 153 are rotated, by reason of the drive imparted to cam 167 from cam shaft 168, a slight reciprocatory movement will be imparted to plate 158 on supporting rods 163, 164. As the beams 113 are pivotally connected to plate 158 through arms 155 and pins 157, such reciprocatory movement of the plate 158 will cause the beams 113 to swing back and forth on the shaft 119 so that the moving belts 153 will abut against the outer edges of the flaps 252 of the box blank. Thus, when the box blank reaches the pulleys 121 (Fig. 2) which are spaced by a distance equal to the width of the box blank, the adjacent edges of panels A and D of the blank will extend parallel to each other. As a result, the glued connecting flap 253 and adjacent portion of panel A of the box blank will be properly aligned so that when the blank is opened, a truly rectangular box will be formed.

After the box blank has been squared as above described, as shown in Fig. 5, it will pass between pulleys 41 and 67 which will be aligned with the glued flap 253.

As the pulley 41 is urged downwardly by spring 43, the box blank will be securely gripped by the adjacent portions of belts 42 and 68 to eject said blank between the belts 204 and 212 of the shingling conveyers 174. As is clearly shown in Figs. 5 and 6, the upper run of belt 212 is below the level of the upper run of belt 68 and hence when the box blank is ejected it will drop on said belt 212, the idler roller assemblies 221 retaining the box blank in squared condition.

By reason of the pivotally mounted weighted rollers 194 and 203 and the pivotally mounted pulley 191, the portion of the lower run of belt 204 adjacent the belt 212 and the pulley 236 of conveyer belt 235, will be urged downwardly against the central portion of panel A of the box blanks, thereby retaining such portion against the glued flap.

As the belts 68 and 42 are moving at a faster speed than the belts 204, 212, it is apparent that when the next successive blank is ejected by the belts 42, 68 between belts 204, 212, a shingling effect will be provided, the belt 204 moving upwardly to accommodate the blanks by reason of the pivotal movement of pulley 191 and rollers 194, 203.

By reason of the pivotally mounted weighted roller 202, the belt 204 will be maintained under tension, the roller 196 limiting the downward movement of the upper run of said belt.

The moving belts 204, 212 will advance the shingled box blanks onto conveyor belt 235 which illustratively is moving at the same rate of speed as belts 204, 212, the pivotally mounted weighted rollers 238 exerting pressure on the box blanks until they are discharged from the outlet 14 of the machine to give the glue on connector flaps 253 time to set.

As the belts 153 of the squaring assemblies 112 are moving at the same rate of speed as the belts of the center and side conveyers 16 and 71, there will be no friction against the side edges of the box blanks which might cause deformation or crushing of such edges as the box blank is squared by the oscillatory action of the squaring assemblies.

The equipment squares one box blank at a time and once the box blank is completely squared, i.e., when it passes between the pulleys 121, it is retained in such squared condition until the glue on flap 253 completely sets. Hence, the possibility of displacement of the glued flap once it has been properly positioned is precluded.

The equipment above described may be used to square flap cut boxes 270 of the type shown in Fig. 20 by the addition of a relatively simple attachment which does not require modification of the equipment.

The flap cut box blank as shown in Fig. 20 has four rectangular panels A', B', C' and D' each with a rectangular flap 272 extending laterally from score lines 273. The flaps 272 on panels B' and D' are narrower than those on panels A' and C' and panel D' has a narrow connector flap 274 which is to be glued to the corresponding portion of panel A'.

When the blank 270 shown in Fig. 20 is folded so that the flap 253 is beneath the corresponding portion of panel A' as shown in Fig. 21, it is apparent that the belt 153 of the squaring assemblies 112 would only engage the outer edges of the flaps 272 of panels A' and C'. Hence, unless pressure can be exerted against the outer edges of flaps 272 of panels B' and D', the connector flap 274 may not be properly aligned with respect to panel A' with the result that the box will not be squared.

To provide such pressure, the attachment 275 shown in Figs. 15 and 16 is provided. Each attachment comprises an elongated plate 277, the leading end 278 of which is tapered and bent outwardly.

Extending laterally outwardly from the side of plate 277 adjacent its leading end 278 are a plurality of pins 281 illustratively three in number, each of which mounts a vertical roller 282 as is shown in Fig. 15, the bottom periphery of the rearmost roller 282a being at a lower level than that of the foremost roller 282b for the purpose hereinafter set forth.

The plate 277 at the rear end thereof at its lower edge has a lateral flange 283 from which depend a plurality of pins 284 illustratively three in number, each of which mounts a horizontal roller 285. As shown in Fig. 16, the bottoms of the horizontal rollers are in a plane above that of the rearmost roller 282a and as shown in Fig. 15 the inner periphery of the rearmost roller 285a extends beyond that of the foremost roller 285b.

The plate 277 has mounting openings 286 through which screws extend to secure the plate to the outer side of the beam 74 of the upper assembly 72 of each side of conveyer 71 as shown in Figs. 2 and 8, 9.

Thus, when flap cut box blanks of the type shown in Fig. 20 are being processed, as the blank is advanced between the squaring assemblies 112, as previously described, the belts will react against the outer edges of the wider flaps 272 of panels A' and C' in the manner previously described with respect to the straight cut box blanks in Fig. 18. When the vertical rollers 282 reach the flaps 272 of panel C, these flaps will be cammed downwardly moving away from the outer edges of flaps 272 of panel D' as shown in Fig. 17. With further advance of the blank, the outer edges of panel D' will contact the horizontal rollers 285 which will react thereagainst. Thus, the panel A' will be squared by the belts of the squaring assemblies 112 and the panel D' will be squared by the attachment 275 so that the adjacent edges of panels A' and D' are parallel. Consequently, when the glue on flap 274 sets, the box blank will be square.

It is apparent that the attachment 275 requires no modification of the equipment and may readily be removed if a run of straight cut boxes are to be squared.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Equipment for squaring a folded box blank of the type having a connector flap between its side edges adapted to be glued to the adjacent edge of the folded blank, said equipment comprising a channel having a pair of side walls and an inlet and outlet end, a conveyer to advance such folded box blank longitudinally through said channel from said inlet through said outlet, said outlet end being of predetermined width substantially equal to that of such box blank, whereby the walls of said channel, at least at the outlet end thereof, will engage the side edges of such box blank to square the latter, said conveyor comprising a pair of horizontal vertically-aligned movable belts extending longitudinally of said channel intermediate the walls thereof, said intermediate pair of belts being adapted to be positioned in alignment with such connector flap of such folded box blank, said aligned belts, when said folded box blank is positioned therebetween, securely gripping said folded box blank for dependable advance thereof yet permitting lateral movement of said folded box blank, each of the walls of said channel comprising a vertical belt having its surface movable in the same direction as the horizontal belts.

2. The combination set forth in claim 1 in which said conveyor also includes two pairs of movable side belts, the belts of each pair being vertically aligned and in a horizontal position extending longitudinally of the channel, said pairs of belts being positioned respectively on each side of the intermediate pair of belts, the aligned belts of said two pairs of belts, when such folded box blank is positioned therebetween, securely gripping said folded box blank for dependable advance thereof yet permitting lateral movement of such folded box blank.

3. The combination recited in claim 1 in which the upper belt of said intermediate pair of belts is vertically spaced from the lower intermediate belt along substantially its entire length and has a portion thereof adjacent the outlet end of said channel positioned closely adjacent the corresponding portion of the lower intermediate belt whereby said adjacent portions of the lower intermediate belt and the upper intermediate belt will securely grip the box blank therebetween to eject the latter from the outlet of said channel.

4. The combination recited in claim 1 in which an additional conveyer is associated with said first conveyer, said additional conveyer having an inlet positioned adjacent the outlet end of said channel, and means to drive said additional conveyer at a speed less than that of said first conveyer.

5. The combination recited in claim 1 in which an additional conveyer is associated with said first conveyer, said additional conveyer having an inlet positioned adjacent the outlet end of said channel, means to drive said additional conveyer at a speed less than that of said first conveyer and a guide member on each side of said additional conveyer, said guide members being spaced by a distance substantially equal to the width of the box blank.

6. The combination recited in claim 5 in which means are provided to adjust the spacing between said guide members.

7. The combination set forth in claim 1 in which said vertical belts are transversely spaced and each is an endless belt, a pulley at each end of each of said belts, said pulleys having vertical axes, said belts defining the channel therebetween having the inlet and outlet, means to drive said belts to effect movement of the inner run thereof from the inlet of said channel to the outlet thereof.

8. The combination recited in claim 7 in which a rigid elongated member extends between each associated pair of pulleys, means to mount said pulleys at the ends of each of said elongated members, a plurality of vertical rollers mounted on each of said elongated members, the inner run of each of said belts riding on the peripheries of the associated rollers.

9. Equipment for squaring a folded box blank comprising a channel having a pair of side walls and an inlet and outlet end, means pivotally to mount the end of at least one of the channel walls at the outlet end of said channel, means to effect oscillatory movement of said wall about its pivotal mount, a conveyer to advance such box blank longitudinally through said channel from said inlet through said outlet, said outlet end of said channel being of predetermined width substantially equal to that of such box blank, whereby the walls of said channel, at least at the outlet end thereof, will engage the side edges of said box blank to square the latter.

10. Equipment for squaring flap cut folded box blanks having narrow and wide side flaps, comprising a channel having a pair of side walls and an inlet and outlet end, a conveyor to advance such box blank longitudinally through said channel from said inlet through said outlet, said outlet end of said channel being of predetermined width substantially equal to that of such box blank, whereby the walls of said channel, at least at the outlet end thereof, will engage the side edges of said box blank to square the latter, a deflector member associated with at least one of said side walls and spaced inwardly therefrom, said deflector member having a portion adapted to be engaged by the wider flaps of the moving box blanks to deflect said flaps downwardly and a second portion adapted to be engaged by the side edges of the narrower flaps to urge the latter inwardly in substantially a horizontal plane.

11. Equipment for squaring flap cut folded box blanks having narrow and wide side flaps, comprising a channel having a pair of side walls and an inlet and outlet end, a conveyor to advance such box blank longitudinally through said channel from said inlet through said outlet, said outlet end of said channel being of predetermined width substantially equal to that of such box blank, whereby the walls of said channel, at least at the outlet end thereof, will engage the side edges of said box blank to square the latter, a deflector member associated with each of said side walls and spaced inwardly therefrom, said deflector member having a vertical portion adapted to be engaged by the wider flaps of the moving box blanks to deflect said flaps downwardly and a horizontal portion adapted to be engaged by the side edges of the narrower flaps to urge the latter inwardly in substantially a horizontal plane.

12. The combination set forth in claim 11 in which the vertical portion comprises a roller mounted on a horizontal axis and the horizontal portion comprises a roller mounted on a vertical axis.

13. The combination set forth in claim 11 in which the vertical portion comprises a plurality of longitudinally spaced rollers each mounted on a horizontal axis with the lower portion of the periphery of the foremost roller being higher than that of the rearmost roller and the horizontal portion comprises a plurality of longitudinally spaced rollers, each mounted in a vertical axis with the periphery of the rearmost roller extending further inwardly than that of the foremost roller.

14. Equipment for squaring a folded box blank comprising a pair of transversely spaced elongated endless belts, each having an uninterrupted surface and each lying in substantially a vertical plane, a pulley at each end of each of said belts, said pulleys having vertical axes, said belts defining a channel therebetween having an inlet and outlet, means to drive said belts to effect movement of the inner run thereof from the inlet of said channel to the outlet thereof, a rigid elongated member extending between each associated pair of pulleys, means to mount said pulleys at the ends of each of said elongated members, means pivotally mounting each of said elongated members at the outlet end of said channel, means associated with said elongated members at the inlet end of said channel to effect oscillation of said elongated members about their pivotal mount, a conveyer between said belts to advance such box blank longitudinally through the channel from said inlet through said outlet, said discharge end of said channel being of predeterminable width substantially equal to that of such box blanks whereby said movable belts, at least at the discharge end of said channel, will engage the side edges of said box blank to square the latter.

15. Equipment for squaring a folded box blank comprising a pair of transversely spaced elongated endless belts, each having an uninterrupted surface and each lying in substantially a vertical plane, a pulley at each end of each said belts, said pulleys having vertical axes, said belts defining a channel therebetween having an inlet and outlet, means to drive said belts to effect movement of the inner run thereof from the inlet of said channel to the outlet thereof, a rigid elongated member extending between each associated pair of pulleys, means to mount said pulleys at the end of each of said elongated members, a supporting plate for each of said elongated members at the outlet end of said channel, means pivotally mounting said members to said supporting plate, means slidably mounting said supporting plates for transverse movement thereof with respect to said channel, a supporting plate for each of said elongated members at the inlet end of said channel, means slidably mounting said second supporting plates for transverse movement thereof with respect to said channel, a pair of links pivotally connected respectively at one end to each of said second supporting plates and extending at right angles therefrom, means pivotally connecting said elongated members to the other end of an associated link, means coacting with said second supporting plates to effect reciprocatory movement thereof on their supporting means to effect oscillation of said elongated members about their pivotal mounts on the first supporting plates, a conveyer between said belts to advance such box blank longitudinally through the channel from said inlet through said outlet, said discharge end of said channel being of predeterminable width substantially equal to that of such box blanks whereby said movable belts, at least at the discharge end of said channel, will engage the side edges of said box blank to square the latter.

16. The combination recited in claim 15 in which drive means are associated with the pulleys adjacent the outlet end of said channel to effect rotation of the associated belts.

17. The combination recited in claim 15 in which means are provided to adjust the distance between the pulleys associated with each belt to regulate the tension on said belts.

18. The combination recited in claim 15 in which the means to reciprocate each of said second supporting plates comprises a cam having a track, a shaft driving said cam, each of said plates having a cam follower rigid therewith and extending into the track in the associated cam, whereby upon rotation of said cams by said cam shaft said plates will be reciprocated.

References Cited in the file of this patent

UNITED STATES PATENTS

| | | |
|---|---|---|
| 1,707,712 | Cowgill | Apr. 2, 1929 |
| 1,969,581 | Rose | Aug. 7, 1934 |
| 1,986,857 | Roberts et al. | Jan. 8, 1935 |
| 2,036,643 | Richard | Apr. 7, 1936 |
| 2,349,204 | Staude | May 16, 1944 |
| 2,637,251 | Spiess | May 5, 1953 |
| 2,697,236 | McCain et al. | Dec. 21, 1954 |